United States Patent [19]
Kim

[11] Patent Number: 5,210,620
[45] Date of Patent: May 11, 1993

[54] METHOD AND APPARATUS OF CONTROLLING A CAMCORDER BY PROVIDING AN ALARM AND REWINDING A TAPE TO PREVENT UNDESIRED RECORDING

[75] Inventor: Know-Jin Kim, Suweon, Rep. of Korea

[73] Assignee: SamSung Electronics Co., Ltd., Suwon, Rep. of Korea

[21] Appl. No.: 766,776

[22] Filed: Sep. 27, 1991

[30] Foreign Application Priority Data

Dec. 11, 1990 [KR] Rep. of Korea .................... 90-20338

[51] Int. Cl.⁵ ............................................. H04N 5/70
[52] U.S. Cl. .................................. 358/335; 358/310; 358/906; 358/909
[58] Field of Search ................ 358/906, 909, 310, 907, 358/335; 360/5, 33.1, 35.1

[56] References Cited

U.S. PATENT DOCUMENTS

| | | | |
|---|---|---|---|
| 4,400,743 | 8/1983 | Takimoto et al. | 358/906 |
| 4,700,221 | 10/1987 | Yamamoto et al. | 358/906 |
| 4,779,142 | 10/1988 | Freeman et al. | 358/906 |

*Primary Examiner*—Tommy P. Chin
*Assistant Examiner*—Huy Nguyen
*Attorney, Agent, or Firm*—Robert E. Bushnell

[57] ABSTRACT

A method and apparatus of controlling a camcorder, is disclosed which removes an undesired recorded portion of a video tape where the undesired recorded portion occurred with the focus being incorrectly aligned. When an operator diverts his attention from taking pictures, an alarm is provided to the operator when mis-alignment of focusing due to movement of the camcorder continues for a specified time duration, and thereafter a rewinding operation of the tape occurs to the beginning of the undesired recorded portion.

9 Claims, 2 Drawing Sheets

METHOD AND APPARATUS OF CONTROLLING A CAMCORDER BY PROVIDING AN ALARM AND REWINDING A TAPE TO PREVENT UNDESIRED RECORDING

BACKGROUND OF THE INVENTION

The present invention generally relates to a video camera and particularly to a method and apparatus for controlling a recording operation in a camcorder which includes the features of providing alarms to an operator upon misaligned focusing of the camcorder due to movement and undesired recording which occurs when the operator is taking other actions while selecting a record mode, as well as eliminating the an undesired recorded portion.

In general, when taking a picture of a moving object by using a camcorder, a user turns on a record switch, camcorder while holding the camcorder on his shoulders, and focuses on the object as he moves along. Thus, if he should unexpectedly divert his attention from the recorded activity unnecessary picture portions would be sometimes recorded, or misalignment of focusing would often occur due to abrupt movement of the camcorder.

SUMMARY OF THE INVENTION

Accordingly, it is an object of the present invention to overcome the above disadvantages, wherein an automatic alarm is rendered to an operator of a camcorder when a misalignment of focusing occurs or when a specified time interval occurs in the case when an unnecessary picture portion is recorded when the operator diverts his attention from the recorded activity, as well as removing such an undesired picture portion which has been recorded into the camcorder.

According to a preferred embodiment of the present invention, a recording control apparatus for a camcorder is comprised of:

a camera device converting incident light into an electric color signal;

a matrix circuit receiving the electric color signal from the camera device, for producing therefrom a luminance signal and a chroma difference signal;

an encoder generating a video signal by modulating the chroma difference signal in quadrature two-phase;

a video signal processor processing the video signal to thereby provide a processed signal to a recording head;

a bias circuit driving the recording head during recording of the video signal;

an automatic focusing device adjusting a focus by controlling intensity of incident light through a set of lens;

a lens driver operated by an automatic focusing device, for driving the lens;

a temperature sensor, arranged in a given position of the camcorder, for sensing a temperature change due to an operator's hand and therefrom recognizing a recording state of the camcorder;

a controller sensing a signal from the temperature sensor, producing a first signal upon mis-alignment of focusing, producing a second signal controlling the bias circuit to turn off recording of the video signal when the first signal continues to be generated during a specified time interval, and thereafter producing a third signal to rewind an unnecessary picture portion; and alarm generating means receiving the first signal from the controller, for generating an alarm.

According to another aspect of the present invention, a recording control method, wherein an electric color signal is generated from an incident light through a lens, a chroma difference signal is generated from processing the electric color signal, the chroma difference signal is converted into a video signal to thereby be recorded onto a recording head, and a device for automatically adjusting a focus by controlling the lens is provided, comprises the steps of:

recognizing a recording of a camcorder by sensing a temperature of a hand of an operator;

sensing a correct focus setting of a picture to be recorded, and continuously counting a number of misalignments of the correct focus setting;

providing alarms when a time duration of the misalignment of the focusing exceeds a given time value; and if the alarms continue for a predetermined time duration, performing a rewind operation to remove a recorded picture portion corresponding to both the misalignment of focusing and the alarms.

According to still another aspect of the present invention, the alarms may be of audio visual, or preferably both.

BRIEF DESCRIPTION OF THE DRAWINGS

A more complete appreciation of the invention, and many of the attendant advantages thereof, will be readily enjoyed and understood by reference to the following detailed description when considered in conjunction with the accompanying drawings in which like members indicate the same or similar components, wherein.

DETAILED DESCRIPTION OF THE INVENTION

Figure 1:
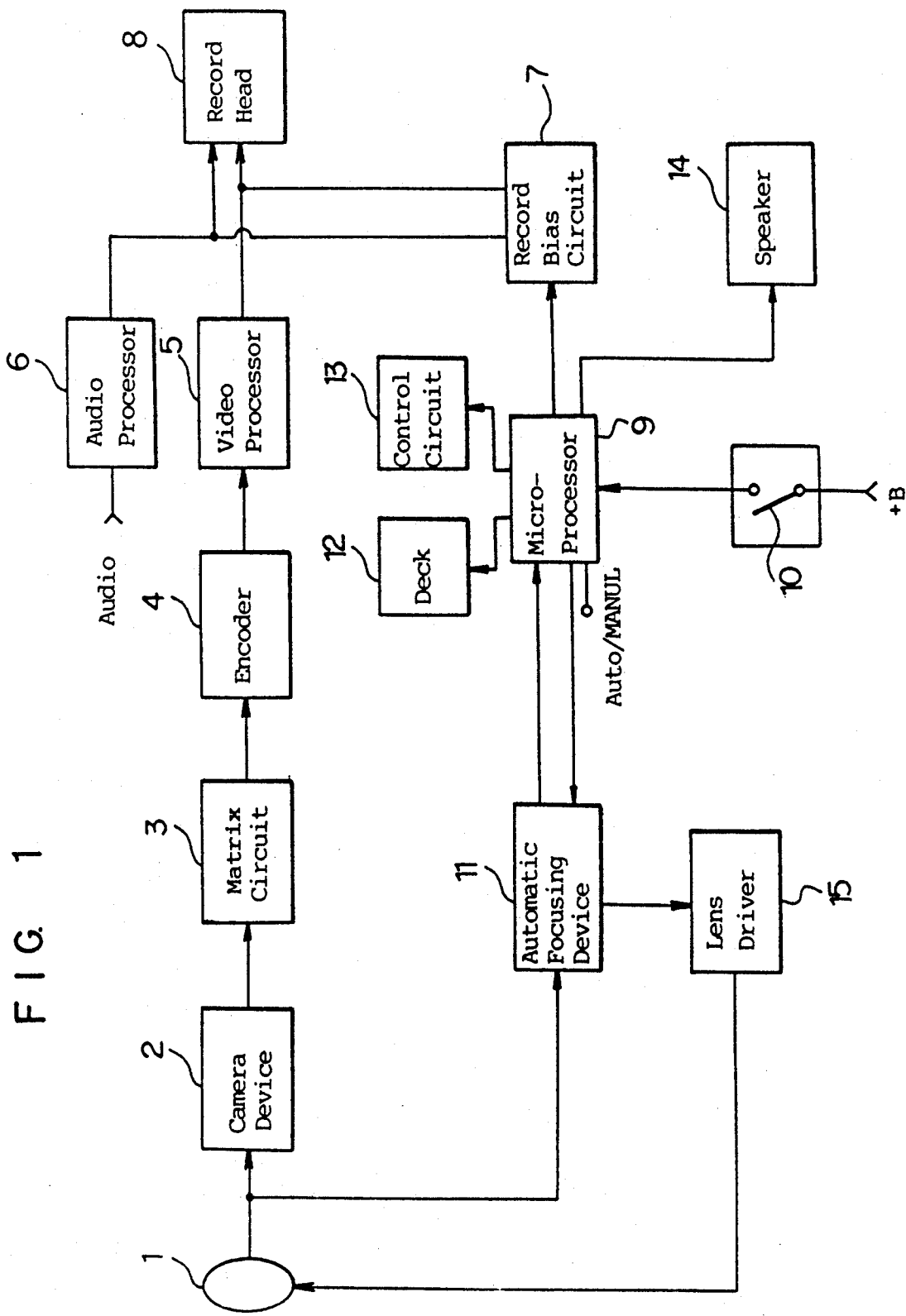
FIG. 1 shows a block diagram of a recording control apparatus for a camcorder according to a preferred embodiment of the present invention.

Referring to FIG. 1, a block diagram indicative of a recording control apparatus for a camcorder according to the invention, an incident light through a lens 1 is converted into three color signals, red, green and blue by a camera device 2. Each of the red, green and blue color signals is amplified be an amplifier (not shown) to thereafter by applied to a matrix circuit 3. The matrix circuit 3 produces a luminance signal and a chroma-difference signal applied to an encoder 4. The chroma-difference signal is modulated in quadrature two-phase by a known method at the encoder and thereafter is added to the luminance signal. Thus, the modulated and added signal is provided from the encoder 4, as a video signal.

The video signal is applied to a video signal processor 5, and the video signal and an audio signal from an audio processor 6 are recorded onto a video tape (not shown) through a recording head 8 along a bias voltage applied from a record bias circuit 7.

Hereinafter, the audio-video recording operation under control of a microprocessor 9, will be described in detail. First, in a case where a camcorder provided with the circuit as shown in FIG. 1 is operated in a manual mode (that is, with the camcorder being held on an operator's shoulders, taking a picture of a given object with a temperature sensor 10 turned on), once the operator begins to record the temperature sensor 10 provided at a given position of the camcorder is turned on/off by a temperature change due to a positioning of a hand of the operator. The microprocessor 9 determines whether the camcorder is a manual mode or in an automatic mode, and when the operator is setting a manual/automatic mode selection switch into a manual mode, the microprocessor 9 senses to turn on the temperature sensor 10

Once the temperature sensor 10 is turned on, as determined by the microprocessor 9, an automatic focusing device 11 determines whether a current picture is focused. If it is correctly focused and a signal is applied from the temperature sensor 10, the microprocessor 9 enables a deck 12, a control circuit 13 and a record head 8, by which an entire sequence of recording audio-video signals is accomplished.

In the meanwhile, in a case where the current picture is unfocused due to movement of the camcorder when the operator takes a further action during the turning on of the temperature sensor 10, the microprocessor 9 recognizes whether the current picture remains unfocused during a given time interval. If so, the microprocessor 9 determines an elapsed time that the current picture remains unfocused and controls the record bias circuit 7, by which the bias voltage applied to the record head 8 is cut off and alarm means 14 is turned on to provide, for instance, a visual or audible alarm to the operator. Then, the microprocessor 9 recognizes whether the alarm continues during a specified time duration, and when focusing is correct, the alarm is turned off. However, if the alarm continues it is after the specified time duration has elapsed, it is the microprocessor controls the deck 12 and the control circuit 13 so that, after rewinding the to a beginning of an undesirably recorded section video tape, the camcorder is kept in a stand-by state.

In general, because the camcorder is built to record with an operator's hand on the camcorder, when the hand is removed from a proper position of the camcorder, which substantially means that the operator has diverted from recording, the microprocessor 9 recognizes the diversion. In this case, unless a signal is received from the temperature sensor 10 for a given period of time, the microprocessor 10, provides an alarm such as a sound from a speaker 14 for a given time duration, and then it determines an elapsed time that the alarm is activated. Therefore, if the signal is received from the temperature sensor 10 within the given period time, the camcorder is returned to a normal state, otherwise the microprocessor controls the deck 12, the control circuit 13 and the record bias circuit 7, thereby returning the camcorder into the stand-by state, as in the foregoing description.

In the meantime, when the camcorder is operated in an automatic mode (for example, for time elapse photography or fixed position photography), there is no requirement to sense temperature changes of an operator's hand. Hence, the microprocessor 9 enables an automatic focusing device 11 and a lens driving device 15, to perform recording by controlling the lens 1.

Figure 2:
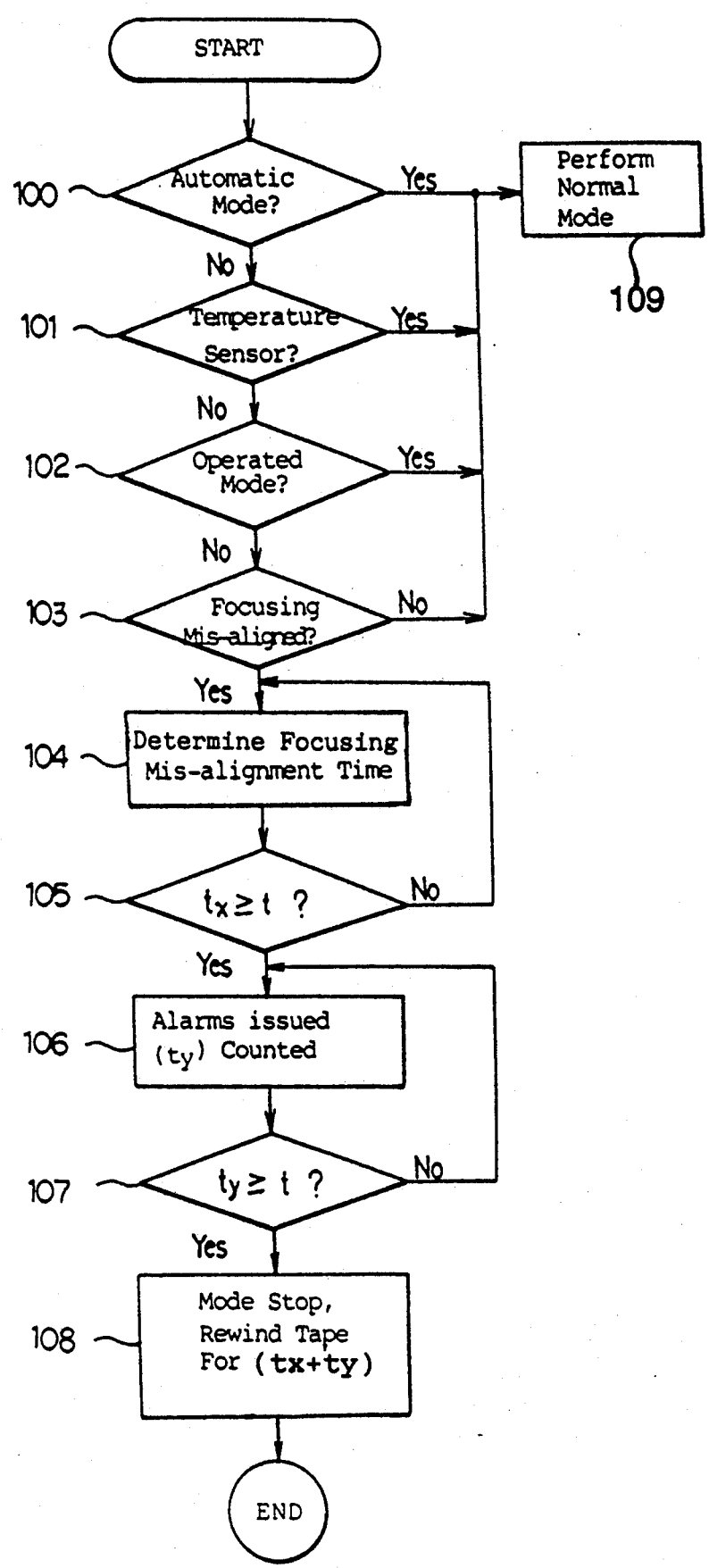
FIG. 2 shows a flow chart for a recording method according to a preferred embodiment of the present invention.

FIG. 2 shows a flow chart diagram of a preferred embodiment of the recording method according to the present invention. First, the microprocessor 9 determines whether the current mode is an automatic mode or a manual mode. When it is a manual mode, the control program proceeds from step 100 to step 101 in order to judge whether the temperature sensor 10 is turned on. If the sensor 10 is off, it is determined whether any other mode is manipulated, in step 102. Thereafter, the microprocessor 9 senses whether it is focused correctly, and if it is focused incorrectly, then the control sequence proceeds from step 103 to step 104, when the microprocessor makes it possible to determine the elapsed time duration of the incorrect alignment of focusing, in step 104.

Thereafter, in the case where the incorrect alignment of focusing does not continue for a specified time duration, the control program proceeds from step 105 to step 104, to thereby continuously determine the incorrect alignment time duration of the focusing. However, if the incorrect alignment of focusing continues for a given time ($t_x$), then the microprocessor 9 provides a control signal for an alarm to the alarm means 14, from which the alarm is produced, and a specified time duration ($t_y$) is determined for maintaining the camcorder in a stand-by state after generation of the alarm, in step 106. In this case, when the focusing is adjusted in a given time, the control program proceeds from step 107 to step 106 and continues to determine the time ($t_y$). If the focusing is not adjusted correctly after the time ($T_y$) has elapsed, the microprocessor 9 stops the recording operation and operates the deck 12 and the control circuit 13, thereby maintaining the apparatus in a stand-by state after rewinding the undesired recording portion on the video tape during the unnecessary time span ($t_x + t_y$), in step 108.

As is apparent from the foregoing description and the accompanying drawings, an automatic alarm is rendered to an operator of a camcorder when there occurs a mis-alignment or incorrect setting of focusing or when a temperature sensor is removed from the operator's hand for a specified time duration where the operator diverts his attention to other actions than videotaping. Further, undesired recording portions the of video tape taken during the unnecessary time span are removed, by rewinding the tape to the beginning of the undesired recording system, thereby performing the most correct recording operation.

While the foregoing provides a full and complete disclosure of the preferred embodiments of the present invention, various modifications, alternate constructions and equivalents thereof may be employed without departing from the true spirit and scope of the invention. Therefore, the above description and illustration should not be construed as limiting the scope of the invention, which is defined by the appended claims.

What is claimed is:

1. A recording control apparatus for use in a camcorder, comprising:

a camera device converting incident light into an electric color signal;

a matrix circuit receiving the electric color signal from the camera device, for producing therefrom a luminance signal and chroma difference signal;

an encoder generating a video signal by modulating the chroma difference signal in quadrature two-phase;

a video signal processor processing the video signal to thereby provide the processed signal to a recording head;

a bias circuit driving the recording head during recording of the video signal;

an automatic focusing device adjusting a focus by controlling intensity of the incident light passing through a set of lens;

a lens driver operated by the automatic focusing device, for adjusting the lens;

a temperature sensor arranged in the camcorder, for sensing temperature change, after the camcorder enters a recording mode, due to contact of a hand of an operator and for providing a temperature sensed signal corresponding to a temperature of the hand indicating that the camcorder is recording a desired recorded portion of a video tape;

control means for sensing the temperature sensed signal, for producing a first signal in dependence upon occurrence of one of reception a signal indicating mis-alignment of focusing from the automatic focusing device, and said temperature sensed signal indicating an absence of the hand after the camcorder has entered into the recording mode, for producing a second signal controlling the bias circuit to turn off the recording mode when the first signal continues to be generated for a predetermined time, and for producing a third signal to rewind videotape within the camcorder to a beginning of a selected recorded portion of the video tape, said selected recorded portion corresponding to a section of the video tape recorded during a period defined by one of the predetermined time and after the camcorder enters a recording mode, when no temperature sensed signal is provided by the temperature sensor; and alarm generating means receiving the second signal from the control means, for generating an alarm for a specified time.

2. The recording control apparatus according to claim 1, wherein said alarm generating means generates an audible sound as an alarm.

3. The recording control apparatus according to claim 1, wherein said alarm generating means generates a visual indication as an alarm.

4. The recording control apparatus according to claim 1, wherein said alarm generating means generates an audible alarm and a visual alarm concurrently.

5. A control method for a camcorder, wherein an electric color signal is generated from an incident light through a lens, a chroma difference signal is generated on a basis of the electric color signal, the chroma difference signal is converted into a video signal to thereby be recorded onto a video tape by a recording head, and a device automatically adjusts a focus by controlling the lens, said method comprising the steps of:

recognizing, after the camcorder enters a recording mode, recording upon a medium within the camcorder of a selected recorded portion by the camcorder by sensing a temperature of a hand of an operator on the camcorder;

sensing focusing of the camcorder and determining mis-alignment of said focusing;

providing an alarm when a time duration of the mis-alignment of the focusing exceeds a given time value, and if the alarm continues beyond a specified time, returning the medium within the camcorder to a frame corresponding to a period defined by one of a beginning of the mis-alignment of focusing, and occurrence of the camcorder entering into the recording mode while no hand temperature is sensed.

6. A recording control device for a video recorder, said recording control device comprising:

temperature sensing means for, during recording of video signals by the video recorder, providing a temperature sensed signal corresponding to a temperature at a part of the video recorder, by providing a first logic state for the temperature sensed signal in response to a range of temperatures including a bodily temperature of a user and a second logic state for the temperature sensed signal corresponding to said temperature not being within said range;

control mean for providing when a mis-alignment signal from a focussing device of the video recorder for a predetermined period of time during occurrence of the second logic state of the temperature sensed signal:

a stop-recording signal to stop said recording by the video recorder upon a recording medium within the video recorder, and a rewind signal to return the recording medium to a frame of the video signal corresponding in time to one of a time when the second logic state of the temperature sensed signal first occurred and a time when the mis-alignment signal was first provided.

7. The device of claim 6, further comprised of means for generating an alarm detectable by the user of the video recorder for a specified period of time, in response to occurrence of said mis-alignment signal for said predetermined period during occurrence of said second logic state of the temperature sensed signal.

8. A method for controlling a video recorder, said control method comprising the steps of:

sensing a temperature at a part of the video recorder and providing a temperature sensed signal during recording of the video recorder, said temperature sensed signal having a first logic state corresponding to temperatures within a range of temperatures activated by body temperatures of a human user and a second logic state corresponding to temperatures not within said range;

generating a mis-alignment signal when the video recorder is not optically focussed;

generating, when the mis-alignment signal occurs for a predetermined period of time during occurrence of the second logic state of the temperature sensed signal:

a stop-recording signal to stop the recording of a video signal upon a recordable medium within the video recorder, and a rewind signal to return the recordable medium to a frame corresponding in time to one of a first time when the second logic state of the temperature sensed signal was first received and a second time when the mis-alignment signal was first received.

9. The process of claim 8, further comprised of generating for a specified period of time, an alarm indication detectable by the user of the video recorder in response to occurrence of said mis-alignment signal for said predetermined period during occurrence of said second logic state.

* * * * *

UNITED STATES PATENT AND TRADEMARK OFFICE
CERTIFICATE OF CORRECTION

PATENT NO. : 5,210,620
DATED : 11 May 1993
INVENTOR(S) : Know-Jin Kim

It is certified that error appears in the above-indentified patent and that said Letters Patent is hereby corrected as shown below:

Column 1,

Line 20,     delete "camcorder" (first occurrence);

Column 3,

Line 33,     delete "it is";

Line 34,     delete "it is";

Line 51,     before "time", insert --of--; and

Column 4,

Line 42,     replace "system" with --portion--.

Signed and Sealed this

Sixth Day of September, 1994

Attest:

BRUCE LEHMAN

Attesting Officer      *Commissioner of Patents and Trademarks*